United States Patent [19]
Hunakoshi et al.

[11] Patent Number: 6,054,033
[45] Date of Patent: Apr. 25, 2000

[54] CATHODIC ELECTRODEPOSITION PAINT

[75] Inventors: Fumio Hunakoshi, Akashi; Toshiyuki Ishii, Neyagawa, both of Japan

[73] Assignee: Nippon Paint Co., Ltd., Osaka, Japan

[21] Appl. No.: 09/046,688

[22] Filed: Mar. 24, 1998

[30] Foreign Application Priority Data

Mar. 25, 1997 [JP] Japan ................................. 9-091604

[51] Int. Cl.$^7$ .................................................. C25B 1/26
[52] U.S. Cl. ........................ 204/501; 204/505; 204/507; 204/509; 523/408
[58] Field of Search ........................... 523/408; 204/501, 204/505, 507, 509

[56] References Cited

U.S. PATENT DOCUMENTS 4,865,704  9/1989  Saatweber .

FOREIGN PATENT DOCUMENTS 259181  3/1988  European Pat. Off. .

*Primary Examiner*—Robert Dawson
*Assistant Examiner*—D. Aylward
*Attorney, Agent, or Firm*—Millen, White, Zelano & Branigan

[57] ABSTRACT

A cathodic electrodeposition paint composition for one or two coats finish comprises (a) an amine-modified polyphenol epoxy resin, (b) an acrylic copolymer having ionizable groups, and (c) resin particles having a particle size of less than 1.0 $\mu$m comprised of a core of gelled hydrophobic resin and a shell layer of amino group-containing hydrophilic resin. Components (a), (b) and (c) as well as blocked polyisocyanate crosslinker are dispersed in an aqueous medium containing a neutralizing agent. The paint composition is effective for diminishing the occurrence of stripe-like recessed patterns in the finished steel substrate.

25 Claims, No Drawings

CATHODIC ELECTRODEPOSITION PAINT

BACKGROUND OF THE INVENTION

This invention relates to a cathodic electrodeposition paint composition. More particularly, it relates to a cathodic electrodeposition paint useful in one or two coats finish of steel substrates.

Electrically deposited paint films may be susceptible to a variety of appearance defects upon curing for a number of reasons. One of such defects is tiny craters induced by oil droplets or other particulate matter deposited throughout the wet films. It is known that such cratering may be prevented or minimized effectively by increasing the viscosity of the surface layer of wet paint films and a variety of additives useful for this purpose have been proposed.

Apart from the cratering, the paint films may be susceptible to another appearance defect hereinafter referred to as "stripe-like recess" for a totally different reason. The stripe-like recesses appear locally on the cured paint films as waves of stripe-like surface irregularities. It is postulated that the cause of stripe-like recesses is present in the metallic substrate onto which the paint is applied. Prior to applying the paint electrically, the substrate is usually subjected to certain pretreatment steps including degreasing and phosphate treatment. When the substrate is not thoroughly degreased or not thoroughly rinsed after degreasing, any residues tend to be concentrated in a localized area upon drying to form wave-like patterns of deposited matter. These patterns are not visible with naked eyes and subsequently develop into visible patterns only after the substrate is finished with an electrodeposition paint.

Because the cause of its occurrence is different, it is apparent that known methods for the prevention of cratering would not be effective for the prevention of stripe-like recesses.

It is, therefore, a principal object of the present invention to provide a cathodic electrodeposition paint composition, particularly for use in one or two coats finish which is hardly susceptible to stripe-like recesses.

SUMMARY OF THE INVENTION

The present invention provides a cathodic electrodeposition paint composition comprising:

(a) an amine-modified polyphenol epoxy resin, (b) an acrylic copolymer having ionizable groups, (c) resin particles having a particle size of less than 1.0 μm, said particles being comprised of a core of gelled hydrophobic resin and a shell of amino group-containing hydrophilic resin surrounding said core and (d) a blocked polyisocyanate crosslinker;

said components(a) through (d) being dispersed in an aqueous medium containing a neutralizing agent.

In a preferred embodiment, said acrylic copolymer having ionizable groups (b) is either an acrylic copolymer having cationizable groups such as amino group corresponding to an amine number from 10 to 100 and a number average molecular weight from 1,000 to 50,000, or an acrylic copolymer having anionizable groups such as carboxyl group corresponding to an acid number from 1 to 50 and a number average molecular weight from 1,000 to 50,000.

In a preferred embodiment, said resin particles (c) comprises a shell of amino group-containing hydrophilic resin which finds use in cathodic electrodeposition paints as binder resin and a core of hydrophobic resin capable of self-crosslinking or capable of crosslinking the shell layer therewith. Alternatively, the resin particles (c) can be an emulsion produced by emulsion-polymerizing ethylenically unsaturated monomers in an aqueous medium containing a hydrophilic resin as emulsifier.

In a preferred embodiment, the paint composition of the present invention comprises said components (a), (b) and (c) in relative weight proportions of 60 to 90 parts, 1 to 20 parts and 1–20 parts as solids, respectively.

DESCRIPTION OF THE PREFERRED EMBODIMENTS

Component (a)

Amine-modified, epoxy-based cationic resins used for cathodic electrodeposition paints are well-known in the art. These resins are generally produced by ring opening the epoxy rings present in an epoxy resin with a primary or secondary amine or with a tertiary amine acid addition salt. Typical examples of starting epoxy resins are polyphenol polyglycidyl ethers produced by reacting epichlorohydrine with a polycyclic polyphenol such as bisphenol A, bisphenol F, bisphenol S, phenol novolac or cresol novolac resin.

Prior to the reaction with amines, the starting resin may be chain-extended by reacting with a bifunctional polyester polyol, polyether polyol, bisphenol or dibasic carboxylic acid. Alternatively, the starting resin may be modified, prior to the reaction with amines, by the reaction of a portion of epoxy rings with a monohydroxyl compound such as 2-ethylhexanol, nonylphenol, ethylene glycol mono-2-ethylhexyl ether or propylene glycol mono-2-ethylhexyl ether in order to adjust molecular weight or amine equivalent weight or to impart improved thermal flowability.

Then, amino groups are introduced by the ring opening reaction of epoxy groups with amines. Examples of primary, secondary or tertiary amine acid salts include butylamine, octylamine, diethylamine, dibutylamine, methylbutylamine, monoethanolamine, diethanolamine, N-methylethanolamine, triethylamine acid addition salts, N,N-dimethylethanolamine acid addition salts and the like. Secondary amines having a ketimine blocked primary amino group such as amino-ethylethanolamine methyl isobutyl ketimine are often used. These amines are preferable reacted in a stoichiometric amount so that all of remaining epoxy groups are ring-opened.

Component (b)

Component (b) is an acrylic copolymer having as ionizable groups either amino groups or carboxyl groups.

Acrylic copolymers having amino groups may be produced by copolymering (i) an amino group-containing acrylic monomer, (ii) a hydroxyl group-containing acrylic monomer, and (iii) other ethylenically unsaturated monomers. Typical examples of amino group-containing acrylic monomers include N,N-dimethylaminoethyl (meth)acrylte, N,N-diethylaminoethyl (meth)acrylate, N,N-dimethylaminopropyl (meth) acrylate or N,N-diethylaminopropyl (meth)acrylate. A variety of hydroxyl group-containing acrylic monomers may be used including mono(meth)acrylic acid esters of alkylene glycols such as 2-hydroxyethyl (meth)acrylate, 2-hydroxypropyl (meth) acrylate, 6-hydroxyhexyl (meth) acrylate, 4-hydroxybutyl (meth)acrylate, polypropylene glycol mono-(meth)acrylate or 1,6-hexanediol mono-(meth) acrylate. Also included are acrylamide or methacrylamide derivatives such as N-hydroxyethyl (meth)acrylamide or N-hydroxypropyl (meth)acrylamide as well as reaction products of a hydroxyalkyl (meth)acrylate and ε-caprolactone or a six membered cyclic alkylenecarbonate. Other ethylenically unsaturated monomers (iii) include, for example, methyl (meth)acrylate, ethyl (meth)acrylate, n-propyl (meth) acrylate, isopropyl (meth)acrylate, n-butyl (meth)acrylate, isobutyl (meth) acrylate, cyclohexyl (meth)acrylate, 2-ethylhexyl (meth) acrylate, dodecyl (meth)acrylate, styrene, vinyltoluene, α-methylstyrene, (meth)acrylonitrile, (meth)acrylamide and vinyl acetate.

Acrylic copolymers having amino groups may also be produced by copolymerizing a monomer having epoxy group such as glycidyl (meth)acrylate, a hydroxyl group-containing acrylic monomer and other ethylenically unsaturated monomers, and then reacting the resulting copolymer with a secondary amine. Examples of secondary amines are diethylamine, dibutylamine, dicyclohexylamine, morpholine, diethanolamine and N-methylethanolamine. Secondary amines having a hydroxyl group are particularly preferable. Ketiminized secondary amines such as diethylenetriamine methylisobutyl ketimine or 2-(2-aminoethyl) ethanol methylisobutyl ketimine may also be used.

The amino group-containing acrylic polymers may comprise as a portion of the above-mentioned other ethylenically unsaturated monomer, an acrylic monomer having etherial linkage for the prevention of film defects other than stripe-like recesses. Examples thereof include 2-methoxyethyl (meth)acrylate, 4-methoxybutyl (meth)acrylate, tetrahydrofuryl (meth)acrylate, 2-ethoxyethyl (meth) acrylate, 2-propoxyethyl (meth)acrylate, 4-(2-ethylhexyloxy)butyl (meth)acrylate and furfuryl (meth) acrylate.

The polymerization may be carried out by the conventional solution polymerization method. The acrylic copolymer may have a number molecular weight from 1,000 to 50,000, preferably from 2,000 to 20,000. A chain transfer agent such as dodecylmercaptan or 2-ethylhexyl thioglycolate may be used in the polymerization. The monomeric proprotions of amino acrylate monomer or its precursor glycidyl acrylate monomer and of hydroxyl group-containing monomer are such that the resulting copolymer has an amine number from 10 to 100 meq/100 g and a hydroxyl number of at least 50 mg KOH/g.

Component (b) may be an acrylic copolymer having carboxyl groups. Such copolymers may be produced by copolymerizing a carboxyl group-containing monomer and monomers free from carboxyl group (copolymerization method), or by reacting hydroxy group-containing acrylic polymers with a polycarboxylic acid anhydride to form a half ester (acid anhydride method), or polymerizing acrylic monomers using a carboxyl group-containing polymerization initiator (initiator method). These methods will now be described in detail.

(1) Copolymerization method:

In this method, a carboxyl group-containing monomer such as acrylic acid, methacrylic acid or itaconic acid is copolymerized with a monomer free from the carboxyl group such as methyl (meth)acrylate, ethyl (meth)acrylate, n-propyl (meth)acrylate, isopropyl (meth)acrylate, n-butyl (meth)acrylate, isobutyl (meth)acrylate, cyclohexyl (meth) acrylate, 2-ethylhexyl (meth)acrylate, dodecyl (meth) acrylate, 2-methoxyethyl (meth)acrylate, 4-methoxybutyl (meth)acrylate, tetrahydrofurfuryl (meth)acrylate, styrene, vinyltoluene, α-methylstyrene, (meth)acrylonitrile, (meth) acrylamide or vinyl acetate.

Hydroxyl group-containing monomers may also be used in conjuction with the above named monomers having neither carboxyl nor hydroxyl group and include, for example, 2-hydroxyethyl (meth)acrylate, 2-hydroxypropyl (meth)acrylate, 6-hydroxyhexyl (meth)acrylate, 4-hydroxybutyl(meth) acrylate, polypropylene glycol mono (meth)acrylate, 1,6-hexanediol mono(meth)acrylate, N-hydroxyethyl (meth) acrylamide, N-hydroxypropyl (meth)acrylamide, adduct of hydroxyalkyl (meth)acrylate with ε-caprolactone and adduct of hydroxyalkyl (meth) acrylate with a six membered cyclic alkylenecarbonate.

(2) Acid anhydride method:

This method utilizes a ring opening reaction of polybasic carboxylic acid anhydride such as phthalic, succinic, tetrahydrophthalic, hexahydrophthalic, tetrabromophthalic, tetrachlorophthalic, hymic, maleic or trimellitic anhydride. The other reactant is an acrylic copolymer having hydroxyl groups produced, for example, by copolymerizing one of monomers having hydroxyl group and one of monomers having neither carboxyl nor hydroxyl group described in connection with the above copolymerization method.

(3) Initiator method:

In the initiator method, monomers having neither carboxyl nor hydroxyl group optionally in combination with a hydroxyl group-containing monomer described in connection with the above copolymerization method are polymerized in the presence of a polymerization initiator having carboxyl group such as 4,4'-azobis(4-cyanovaleric acid), 7,7'-azobis(7-cyanocaprilic acid), 6,6'-azobis(6-cyano-6-cyclohexylcapric acid), 2,2'-azobis(2-methylpropionic acid), 2,2'-azobis(2-ethyl-4-methoxyvaleric acid) or 2,2'-azobis(2-benzylpropionic acid). When a chain transfer agent having carboxyl group such as thioglycolic acid is used in the polymerization, the carboxyl group may be introduced more effectively to the polymer terminals.

These carboxyl group-containing initiators are preferably used in the form of an amine salt, particularly with a tertiary amine such as pyridine, isoquinoline, quinoline, N,N-cyclohexylamine, α-picoline, N-N-dimethylbenzylamine, tri-n-butylamine, triethylamine, N,N-dimethylaniline, N-ethylmorpholine or N-ethyl-3,5-dimethylmorpholine. The initiator may be used singly or a plurality of initiators may be combined. The amount of initiator is preferably from 0.1 to 15 parts by weight of the monomer mixture.

The carboxyl group-containing acrylic copolymer is produced by the conventional solution method so that the copolymer has a number average molecular weight from 1,000 to 50,000, preferably from 2,000 to 20,000 and an acid number from 1–50, preferably from 3 to 20. The molecular weight may be adjusted as desired by the use of a chain transfer agent such as dodecylmercaptan or 2-ethylhexyl thioglycolate.

Component (c)

When blends of a hydrophilic resin and a hydrophobic resin are emulsified in water, a number of emulsion particles comprised of a core of the hydrophobic resin and a shell layer of the hydrophilic resin are formed. If the hydrophobic resin is capable of self-crosslinking or capable of crosslinking the hydrophilic resin therewith, the hydrophobic resin can be crosslinked into a three dimensional network by heating the emulsion particles. One such method is disclosed in JP-A-63137972 assigned to the assignee of this application. This method employs as the shell-forming hydrophilic resin a cationically modified resin, preferably amine-modified epoxidized polybutadiene resin for making the emulsion particles usable in cathodic electrodeposition paints. The core-forming hydrophobic resins are chosen from etherified methylolphenols, preferably produced by etherifying the phenolic hydroxyl group with a monoepoxide compound such as glycidyl ether. When the amine-modified epoxidized polybutadiene retains an amount of residual oxirane rings, tetrabromobisphenol A may be used in crosslinking. Since the crosslinking reaction of etherified methylolphenols takes place even at a temperature lower than 100° C., the core portions can be crosslinked by heating the emulsion particles in water.

Alternatively, the resin micropaticles having core-shell structure (c) can be produced by emulsion polymerizing a mixture of ethylenically unsaturated monomers containing a polyfunctional monomer such as a polyol poly(meth)acrylate in an aqueous dispersion of a cationized binder resin used in cathodic electrodeposition paints such as amine-modified epoxy resins (a) or amino group-containing acrylic resins (b) of the present invention. This method is disclosed in JP-A-04293973 assigned to the assignee of this application.

Blocked Polyisocyanate

Blocked polyisocyanates are well-known in the coating industry as a crosslinking agent of binder resins having active hydrogen atoms. Although aromatic diisocyanates such as tolylenediisocyanate (TDI), xylylenediisocyanate (XDI) or diphenylmethanediisocyanate (MDI) and alipahtic diisocyanate such as hexamethylenediisocyanate (HMDI) may be used as a starting polyisocyanate compound, alicylic diisocyanates such as isophoronediisocyanate (IPDI), hydrogenated MDI or norbornanediisocyanate, dimers or trimers thereof, or their adducts with a polyhydric alcohol such as trimethylolpropane are preferable in the present invention for the sake of their anticorrosive and non-yellowing properties.

Any known blocking agent may be used for blocking the starting polyisocyanate compounds including alcohols such as n-butanol, 2-ethylhexanol, ethylene glycol monobutyl ether or cyclohexanol; phenols such as phenol, nitrophenol, cresol or nonylphenol; oximes such as dimethylketoxime, methylethylketoxime or methylisobutylketoxime; and lactams such as ε-caprolactam. Oximes and lactams are preferable.

Electrodeposition Paint

The electrodeposition paint composition of the present invention preferably comprises components (a), (b) and (c) in relative weight proportions as solids from 60 to 90 parts for (a), from 1 to 20 parts for (b) and from 1 to 20 parts for (c). Components (b) and (c) are effective to prevent the development of stripe-like surface defects only when used in combination. However, these components are auxiliary components of the paint formulation and, therefore, should not be added in excess in order to avoid an adverse effect on other properties of the paint and paint films.

The electrodeposition paint of the present invention may be prepared by dispersing component (a), component (b) and the blocked polyisocyanate crosslinker in an aqueous medium containing a neutralizing agent to produce a main emulsion, and then adding component (c) and a pigment paste to the main emulsion.

The neutralizing agent is an inorganic acid such as hydrochloric, nitric or phosphoric, acid, or an organic acid such as formic, acetic or lactic acid. The amount of neutralizing agent is such that at least 20% preferably 30 to 60% neutralization of basic resins is achieved. The amount of crosslinker must be sufficient to give a rigid film exhibiting desired performance by the reaction with active hydrogen-containing groups of the binder resin. The ratio of the binder resin to the crosslinker generally lies between 95:5 and 45:5, preferably between 85:15 and 70:30 by weight as solids. The paint may contain from 0.1 to 10% by weight of the crosslinker of a catalyst such as dibutyltin dilaurate, dibutyltin oxide or other urethane-cleaving catalysts.

The paint formulation may contain a variety of conventional additives. Examples thereof include coloring pigments such as titanium dioxide, carbon black or ferric oxide; anticorrosive pigments such as basic lead silicate or aluminum phosphomolybdate; extender pigments such as kaolin, clay or talc; and other additives such as water-miscible organic solvents, surfactants, antioxidants or UV absorbers.

EXAMPLE

The following Examples are given for illustrative purpose only and not for limiting purposes. All parts and percents therein are by weight unless otherwise indicated.

Pigment Pastes:

Production Example 1

19.1 parts of a pigment dispersant resin (quaternized amine-modified epoxy resin, 50% solids), 30.4 parts of titanium dioxide, 14.0 parts of kaolin, 1.4 parts of basic lead silicate, and 0.9 parts of carbon black were milled with 34.3 parts of deionized water in a sand grind mill until a particle size of less than 10 μm was reached to prepare a pigment paste of 56% solids.

Crosslinker

Production Example 2

A flask equipped with a stirrer, thermometer, condenser and nitrogen gas tube was charged with 222 parts of isophoronediisocyanate, 56 parts of methyl isobutyl ketone (MIBK) and 0.5 parts of dibutyltin dilaurate. After heating to 50° C., 17 parts of methylethylketoxime were gradually added while maintaining the inner temperature at 70° C. and allowed to react at the same temperature until the absorbance of NCO group disappeared in the IR spectrometry for about 1 hour. The reaction product was then diluted with 43 parts of n-butanol.

Component (b)

Production Example 3

A flask equipped with a stirrer, thermometer, reflux condenser, nitrogen gas tube and drip funnel was charged with 1,500 parts of butylcellosolve and heated to 120° C. with nitrogen gas bubbling. To this was added dropwise a mixture of 627 parts of methyl methacrylate, 191 parts of lauryl methacrylate, 182 parts of 4-hydroxybutyl acrylate, 300 parts of 2-methoxyethyl acrylate, 200 parts of dimethylaminoethyl methacrylate and 50 parts of t-butylperoxy-2-ethylhexanoate over 3 hours. After the addition, the reaction mixture was allowed to react for additional 3 hours at 120° C. An amino group-containing acrylic copolymer having a number average molecular weight of 10,000 and an amine number of 47 was obtained as a 50% nonvolatile solution.

Production Example 4

The same flask as used in Production Example 3 was charged with 1,050 parts of butylcellosolve and heated to 120 ° C. with nitrogen gas bubbling. To this was added dropwise a mixture of 347 parts of methyl methacrylate, 258 parts of n-butyl acrylate, 394 parts of 2-hydroxyethyl methacrylate and 15 parts of azobiscyanovaleric acid over 3 hours. After the addition, the reaction mixture was allowed to react for additional 3 hours at 120° C. A carboxyl group-containing acrylic copolymer having an average molecular weight of 8,000 and an acid number of 5 was obtained as a 50% nonvolatile solution.

Main Emulsion

Production Example 5

A flask equipped with a stirrer, nitrogen gas tube, condenser and thermometer was charged with 950 parts of a bisphenol A epoxy resin having an epoxy equivalent weight of 950 (EPOTOTE YD-014 available from Toto Kasei Co.) and 237.5 parts of methyl isobutyl ketone and heated at 100° C. until complete dissolution of the resin in MIBK. To this were added 60 parts of N-methylethanolamine and 73 parts of 73% MIBK solution of diethylenetriamine methylisobutylketime with stirring. Thereafter, the mixture was maintained at 120° C. for 1 hour to obtain a cationic binder resin.

1,320 parts of this cationic resin were mixed with 570 parts of the crosslinker of Production Example 2, 90 parts of the amino group-containing acrylic copolymer of Production Example 3 and 100 parts of ethylene glycol monohexyl ether. This mixture was added into a solution of 34 parts of glacial acetic acid in 479 parts of deionized water with stirring, diluted with 2,215 parts of deionized water and evaporated under reduced pressure to remove the organic solvent and water to 36% solids to obtain a main emulsion.

Production Example 6

The same flask as used in Production Example 5 was charged with 950 parts of bisphenol A epoxy resin having an epoxy equivalent weight of 950 (EPOTOTE YD-014 available from Toto Kasei Co.) and 237.5 parts of MIBK and heated at 100° C. until complete dissolution of the resin in MIBK. To this were added 60 parts of N-methylethanolamine and 73 parts of 73% MIBK solution of diethylenetriamine methylisobutylketimine with stirring. Thereafter the mixture was maintained at 120° C. for 1 hour to obtain a cationic binder resin.

1,320 parts of this cationic resin were mixed with 570 parts of the crosslinker of Production Example 2, 90 parts of the carboxyl group-containing acrylic copolymer of Production Example 4 and 100 parts of ethylene glycol monohexyl ether. This mixture was added into a solution of 34 parts of glacial acetic acid in 479 parts of deionized water with stirring, diluted with 2,215 parts of deionized water and evaporated under reduced pressure to remove the organic solvent and water to 36% solids to obtain a main emulsion.

Production Example 7 (for comparison)

Production Example 5 was followed except that the amino group-containing acrylic copolymer was not added.

Gelled Emulsion Particles

Production Example 8

Step 1:

Production Example 5 was followed except that the amount of amino group-containing acrylic copolymer of Production Example 3 was increased from 90 parts to 270 parts. This dispersion was used in the emulsion polymerization in Step 2 below.

Step 2:

A flask equipped with a stirrer, condenser, thermometer and nitrogen gas tube was charged with 12.6 parts of the dispersion of Step 1, 0.27 parts of glacial acetic acid and 120 parts of deionized water, and heated to 75° C. To this were added 20.73 parts of an initiator solution containing 0.5 parts of 2,2'-azobis(N,N-dimethylisobutylamidine), 0.23 parts of glacial acetic acid in 20 parts of deionized water. Then 10 parts of methyl methacrylate were added dropwise over five minutes followed by the dropwise addition of the following monomer mixture over 40 minutes with stirring.

| Material | Parts |
| --- | --- |
| Dispersion of Step 1 | 37.8 |
| Glacial acetic acid | 0.81 |
| Deionized water | 103.49 |
| Styrene | 12.0 |
| n-Butyl acrylate | 10.0 |
| Methyl methacrylate | 52.5 |
| Glycidyl methacrylate | 2.0 |
| Placcel FM-1 (Daicel Chemical Industry) | 3.5 |
| Neopentyl glycol dimethacrylate | 10.0 |

The reaction mixture was stirred for additional 1 hour at 75° C. to complete the reaction. An emulsion of crosslinked resin having 36% solids and a particle size of 78 nm was obtained.

Production Example 9

Step 1:

Polybutadiene B-2000 having a number average molecular weight of 2,000 and 1,2-polymer content of 65% available from Nippon Petrochemicals CO., Ltd. was epoxidized to an oxirane oxygen content of 6.4% with peracetic acid. 1,000 parts of the epoxidized polybutadiene and 354 parts of ethylcellosolve placed in an autoclave were reacted with 62.1 parts of dimethylamine for 5 hours at 150° C. After distilling off unreacted dimethylamine, a solution of amine-modified polybutadiene having an amine number of 120 mmol/100 g solids was obtained as a 75% nonvolatile solution.

Step 2:

| Material | Parts |
| --- | --- |
| TAMANOL 722[1] | 60 |
| Butyl glycidyl ether[2] | 23 |
| n-Butanol | 10 |
| Methoxybutanol | 10 |
| Dimethylbenzylamine | 0.4 |

[1]Resol type phenol resin available from Arakawa Chemical Industry.
[2]Monoepoxide compound available from Toto Kasei.

To a solution of TAMANOL 722 in a mixture of n-butanol and methoxybutanol was added butyl glycidyl ether with stirring and heated to 100° C. After the addition of dimethylbenzylamine, the reaction mixture was stirred for additional 3 hours with cautions of exothermic reaction to maintain the temperature at 100° C. After decreasing the glycidyl content of the reaction product to less than 5% relative to charged amount, the reaction was terminated by cooling. The analysis of the reaction product demonstrated the absence of phenolic hydroxyl group. A β-hydroxy alkyl etherified phenol resin was thus obtained.

Step 3:

| Material | Parts |
| --- | --- |
| Amine-modified polybutadiene of Step 1 | 66.7 |
| | (50 parts as solids) |
| β-hydroxyalkyl etherified phenol resin of Step 2 | 62.5 |
| | (50 parts as solids) |
| Glacial acetic acid | 1.8 |
| Deionized water | 369.0 |

The amine-modified polybutadiene of Step 1 was thoroughly mixed with the β-hydroxyalkyl etherified phenol resin of Step 2 and glacial acetic acid. The mixture was emulsified in deionized water and distilled under reduced pressure while replenishing water to remove the organic solvent. An aliquot of the emulsion was added to a large volume (100 times) of tetrahydrofuran whereupon the emulsion particles dissolved making a clear solution.

Then the emulsion was kept at 55° C. for 7 days and then cooled to obtain an emulsion of cationic gelled resin particles which did not dissolve in tetrahydrofuran and remained suspended as milky suspension. Particle size was 120 nm.

Examples 1–4 and Comparative Examples 1–3

Electrodeposition paints of Examples 1–4 were each produced by blending the main emulsion of Production Example 5 or 6 with the gelled resin emulsion of Production Example 8 or 9 at a ratio of 95:5 as solids and further mixed with the pigment paste of Production Example 1 and deionized water so that a pigment/resin ratio of 20/80 and a solids content of 20% were reached. Electrodeposition paints of Comparative Examples 1–3 were prepared from the main emulsion of Production Example 5 alone or from the main emulsion of Production Example 7 in combination with either the gelled resin emulsion of Production Example 8 or 9, and were otherwise identical to Examples 1–4.

The resulting electrodeposition paints were evaluated by the following methods.

Film flatness and stripe-like recesses

A commercial degreasing solution for phosphate-treated steel substrate (SURFCLEANER 250 sold by Nippon Paint Co., Ltd.) was diluted to 100 fold with deionized water and placed in a stainless steel beaker. To this solution was added a drop of press oil (solubility parameter=8.2) to 10 p.p.m. while stirring with a magnetic stirrer and the stirring was continued for additional 1 hour. A zinc phosphate-treated steel plate was soaked in this solution for 30 second, withdrawn from the solution and then air dried at room temperature. When an upper half area of the substrate was dried, the test paint was applied thereon electrically to a dry film thickness of about 20 μm and then baked at 160° C. for 15 minutes. The resulting cured films were observed visually for appearance. The results are shown in Table 1.

Adhension to overcoating

Each specimen having a cured film of the above test paint was overcoated with a commercial alkyd top coat (ORGA SELECT silver sold by Nippon Paint Co., Ltd.) to a dry film thickness of 25–30 μm and baked at 140° C. for 20 minutes. After leaving at room temperature for 24 hours, the overcoating layer was cut into 100 sections of 2 mm×2 mm size in grid pattern with knife. Then a pressure sensitive adhesion tape was applied on the cut surface and pilled off rapidly. The adhesion to overcoating was evaluated by the number of remaing sections. The results are shown in Table 1.

TABLE 1

|  | Example | | | | Comparative Example | | |
| --- | --- | --- | --- | --- | --- | --- | --- |
|  | 1 | 2 | 3 | 4 | 1 | 2 | 3 |
| Formulation as solids: | | | | | | | |
| Main emulsion of Pro. Ex. 5 | 95 | 95 | — | — | 100 | — | — |
| Main emulsion of Pro. Ex. 6 | — | — | 95 | 95 | — | — | — |
| Main emulsion of Pro. Ex. 7 | — | — | — | — | — | 95 | 90 |
| Gel particle emulsion of Pro. Ex. 8 | 5 | — | 5 | — | — | 5 | 10 |
| Gel particle emulsion of Pro. Ex. 9 | — | 5 | — | 5 | — | — | — |
| Film performance: | | | | | | | |
| Stripe-like recess | Good | Good | Good | Good | Not Good | Not Good | Good |
| Flatness | Good | Good | Good | Good | Good | Good | Not Good |
| Overcoating adhesion | 100/100 | 100/100 | 100/100 | 100/100 | 100/100 | 100/100 | 100/100 |

We claim:

1. A cathodic electrodeposition paint composition comprising:
   (a) an amine-modified polyphenol epoxy resin;
   (b) an acrylic copolymer having ionizable groups;
   (c) resin particles having a particle size of less than 1.0 μm, said particles being comprised of a core of gelled hydrophobic resin and a shell of amino group-containing hydrophilic resin surrounding said core; and
   (d) a blocked polyisocyanate crosslinker;
   said components (a) through (d) being dispersed in an aqueous medium containing a neutralizing agent.

2. The composition according to claim 1, wherein said component (b) is an acrylic copolymer having a number average molecular weight from 1,000 to 50,000 and amino group content corresponding to an amine number from 10 to 100.

3. The composition according to claim 1, wherein said component (b) is an acrylic copolymer having an average molecular weight from 1,000 to 50,000 and a carboxyl group content corresponding to an acid number from 1 to 50.

4. The composition according to claim 1, wherein said component (c) is an emulsion of resin particles comprised of a shell layer of said amino group-containing hydrophilic resin and a core of a hydrophobic resin capable of self-crosslinking or capable of crosslinking said hydrophilic resin of said shell layer therewith.

5. The composition according to claim 1, wherein said component (c) is an emulsion of crosslinked polymer particles forming said core produced by emulsion polymerizing a mixture of ethylenically unsaturated monomers in the presence of said amino group-containing hydrophilic resin as emulsifier.

6. The composition according to claim 1, wherein the relative proportions of said components (a), (b) and (c) are from 60 to 90 parts by weight, from 1 to 20 parts by weight and from 1 to 20 parts by weight as solids, respectively.

7. A method of electrodeposition coating of a steel substrate comprising degreasing and phosphate-treating said substrate, applying electrically the cathodic electrodeposition paint composition of claim 1 thereon to form a paint film, and baking the paint film.

8. The method according to claim 7 further comprising the step of applying an overcoating layer onto the baked electrodeposition paint film.

9. A method of diminishing the occurrence of stripe-like recessed patterns on a steel substrate finished with an electrodeposition paint comprising applying electically the cathodic electrodeposition paint composition of claim 1 onto the degreased and phosphate-treated steel substrate to form a paint film, and baking the paint film.

10. The method according to to claim 9 further comprising the step of applying an overcoating layer onto the baked electrodeposition paint film.

11. A composition according to claim 1, wherein said component (b) is an acrylic copolymer having cationizable groups.

12. A composition according to claim 11, wherein said cationizable groups are amino groups.

13. A composition according to claim 1, wherein said component (b) is an acrylic copolymer having anionizable groups.

14. A composition according to claim 13, wherein said anionizable groups are carboxyl groups.

15. A composition according to claim 1, wherein said component (b) is an acrylic copolymer having ionizable amino or carboxyl groups.

16. A composition according to claim 2, wherein said acrylic copolymer has a number average molecular weight of 2000–20,000.

17. A composition according to claim 3, wherein said acrylic copolymer has a number average molecular weight of 2000–20,000.

18. A composition according to claim 1, wherein said component (b) is an acrylic copolymer having an amine number of 10–100 meq/100 g and a hydroxyl number of at least 50 mg KOH/g.

19. A composition according to claim 3, wherein said acrylic polymer has an acid number of 3–20.

20. A composition according to claim 1, wherein said neutralizing agent is hydrochloric acid, nitric acid, phosphoric acid, formic acid, acetic acid, or lactic acid.

21. A composition according to claim 1, wherein the amount of neutralizing agent is sufficient to achieve at least 20% neutralization of basic resins.

22. A composition according to claim 4, wherein the shell-forming hydrophillic resin is an amine-modified epoxidized polybutadiene.

23. A composition according to claim 4, wherein said core-forming hydrophobic resin is an etherified methylolphenol.

24. A composition according to claim 22, wherein said core-forming hydrophobic resin is an etherified methylolphenol.

25. A composition according to claim 5, wherein said component (c) is obtained by emulsion polymerizing a mixture of ethylenically unsaturated monomers containing a polyol poly-(meth) acrylate in an aqueous dispersion containing an amine-modified epoxy resin or an amino group containing acrylic resin.

* * * * *